M. H. SIDEBOTHAM.
MACHINE FOR MAKING TUBULAR BOX SHELLS.
APPLICATION FILED JUNE 13, 1918.
1,298,586.
Patented Mar. 25, 1919.
8 SHEETS—SHEET 1.
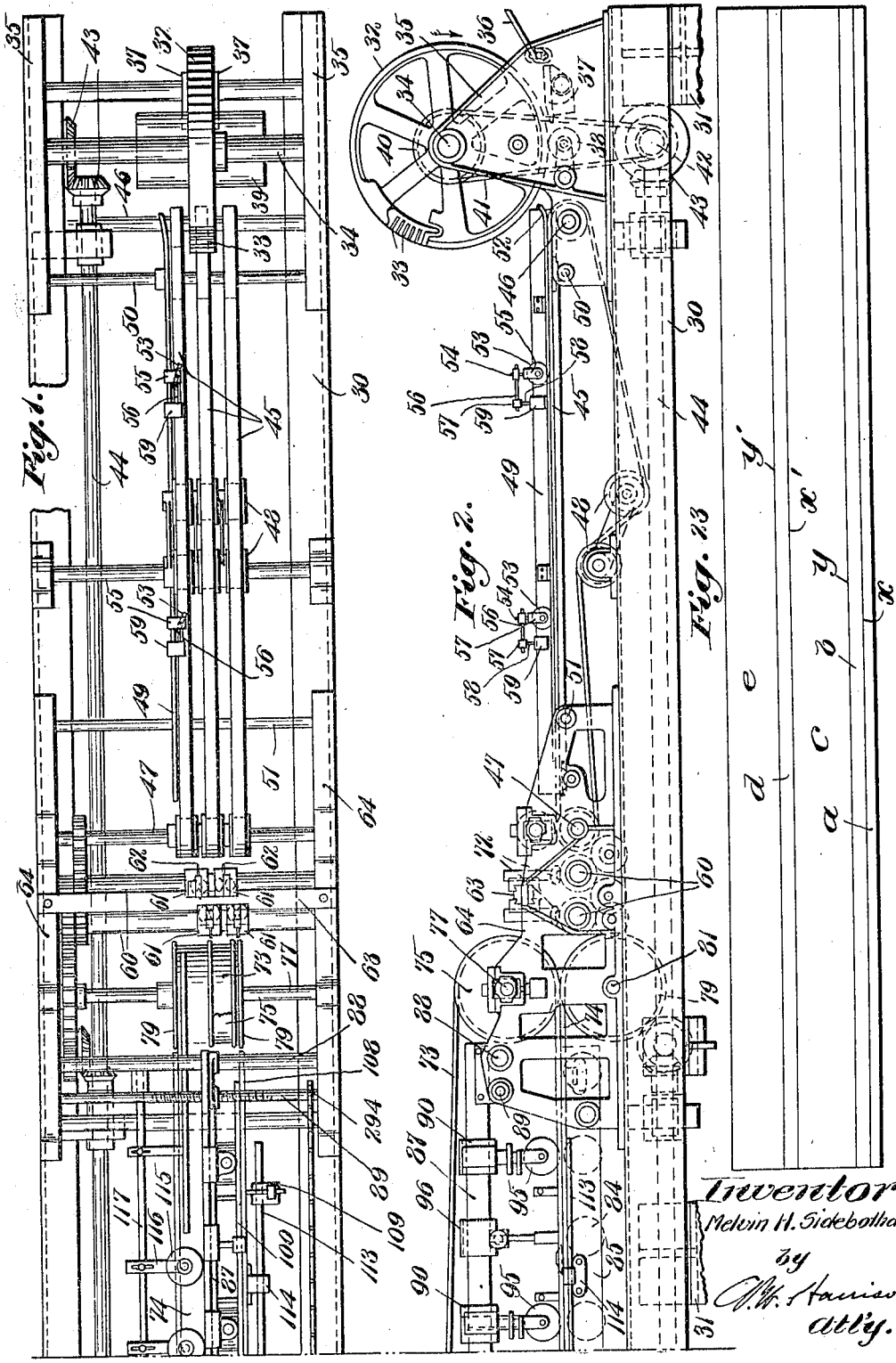
Inventor
Melvin H. Sidebotham
by
/s/ Harrison
atty.

M. H. SIDEBOTHAM.
MACHINE FOR MAKING TUBULAR BOX SHELLS.
APPLICATION FILED JUNE 13, 1918.
1,298,586.
Patented Mar. 25, 1919.
8 SHEETS—SHEET 2.
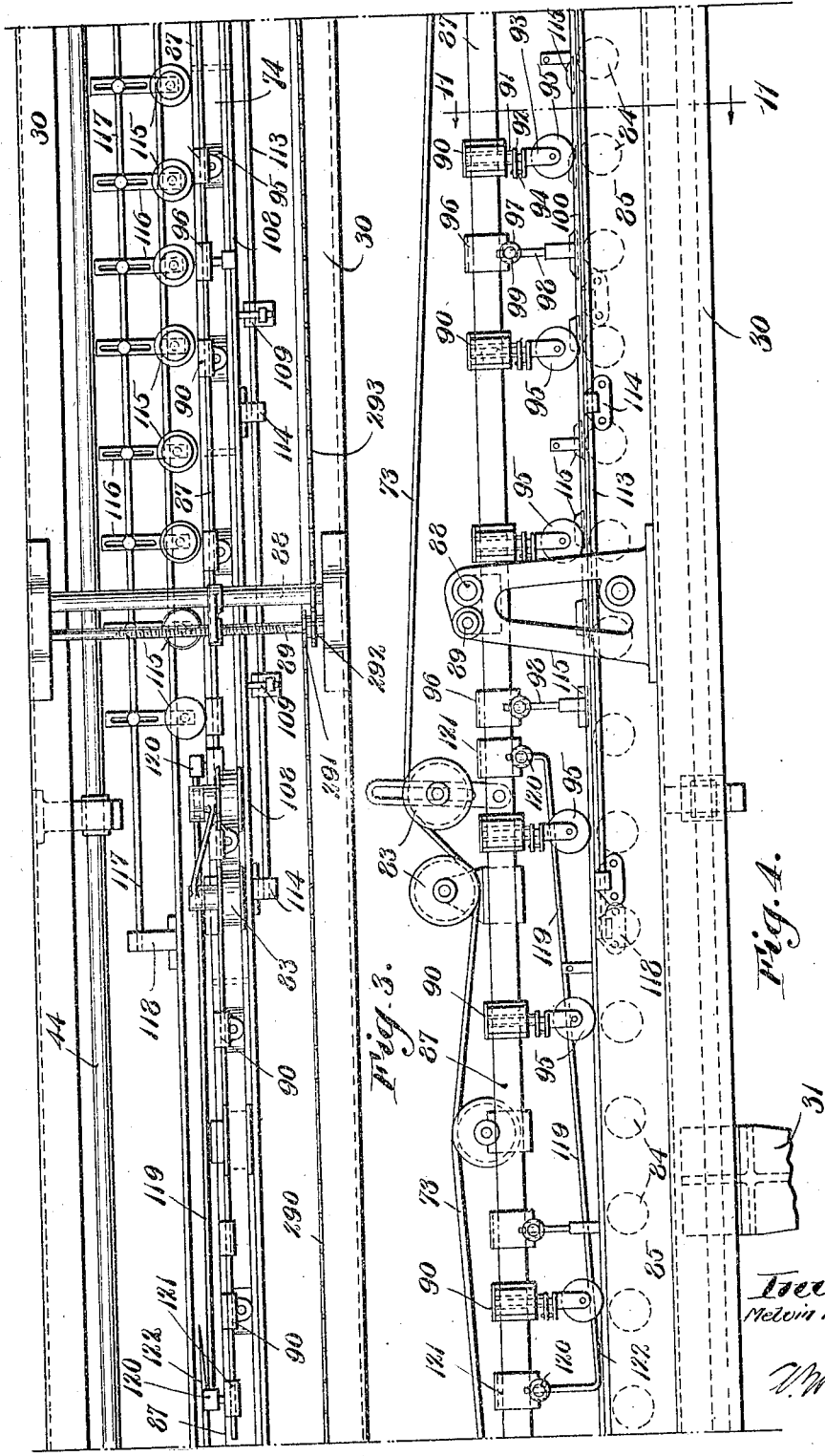

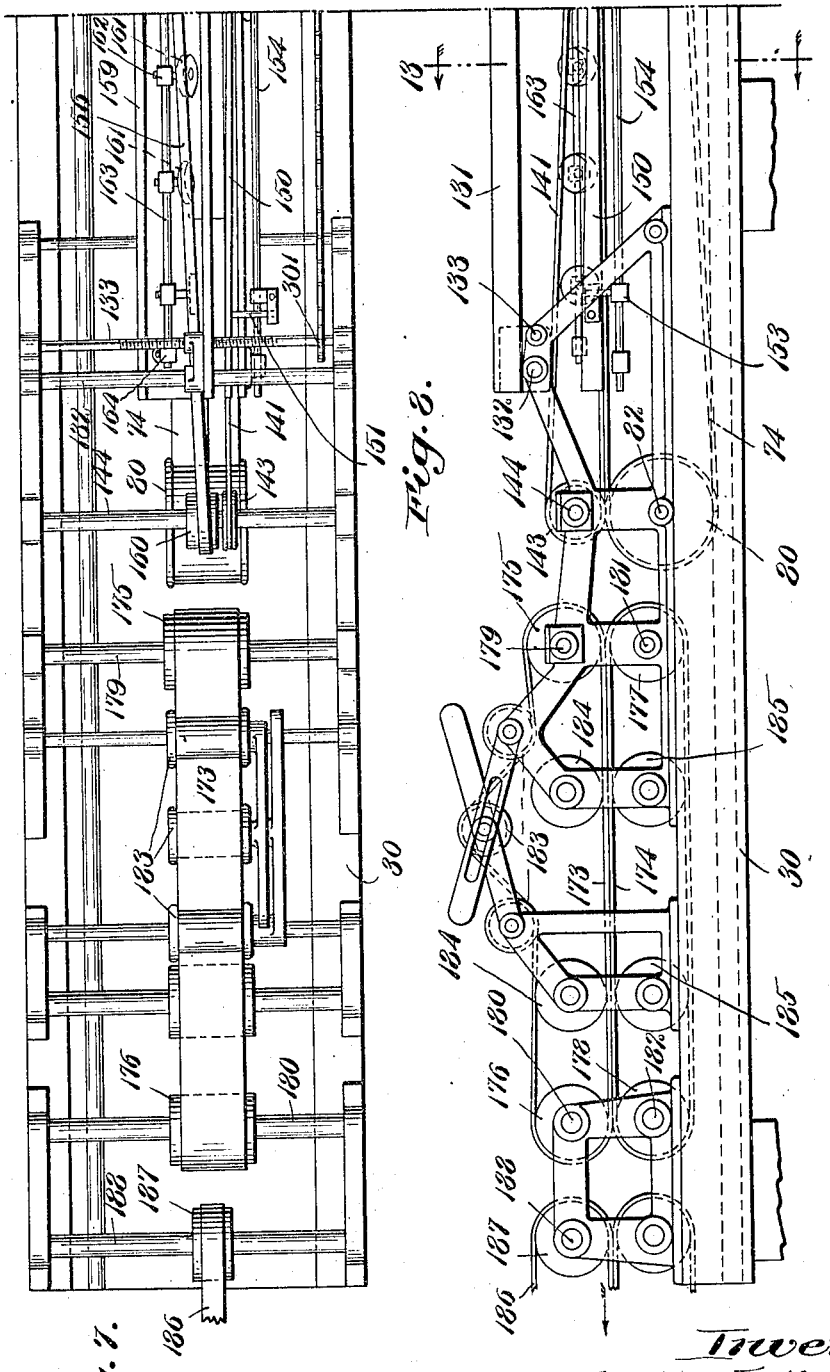

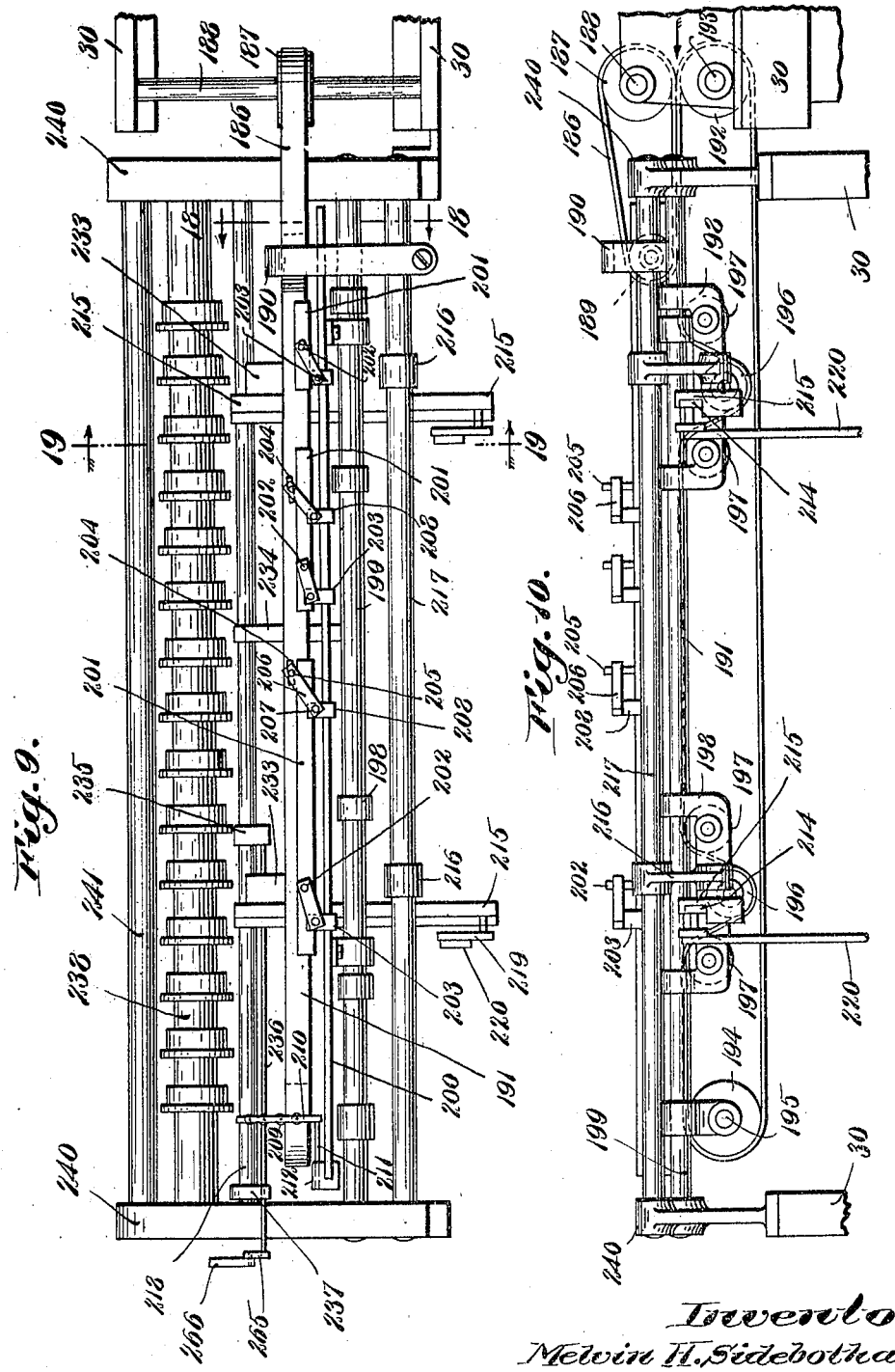

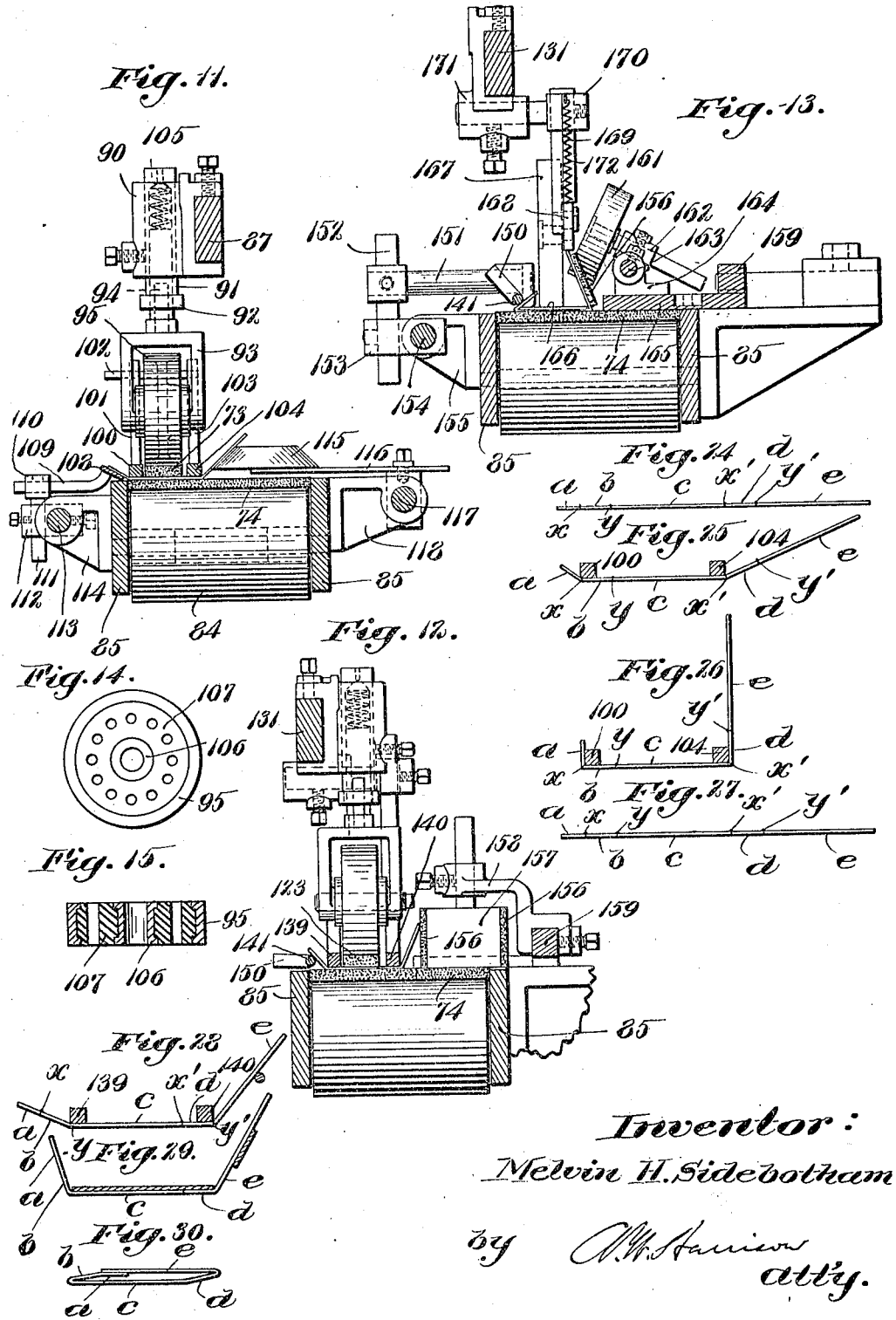

M. H. SIDEBOTHAM.
MACHINE FOR MAKING TUBULAR BOX SHELLS.
APPLICATION FILED JUNE 13, 1918.
1,298,586.
Patented Mar. 25, 1919.
8 SHEETS—SHEET 7.
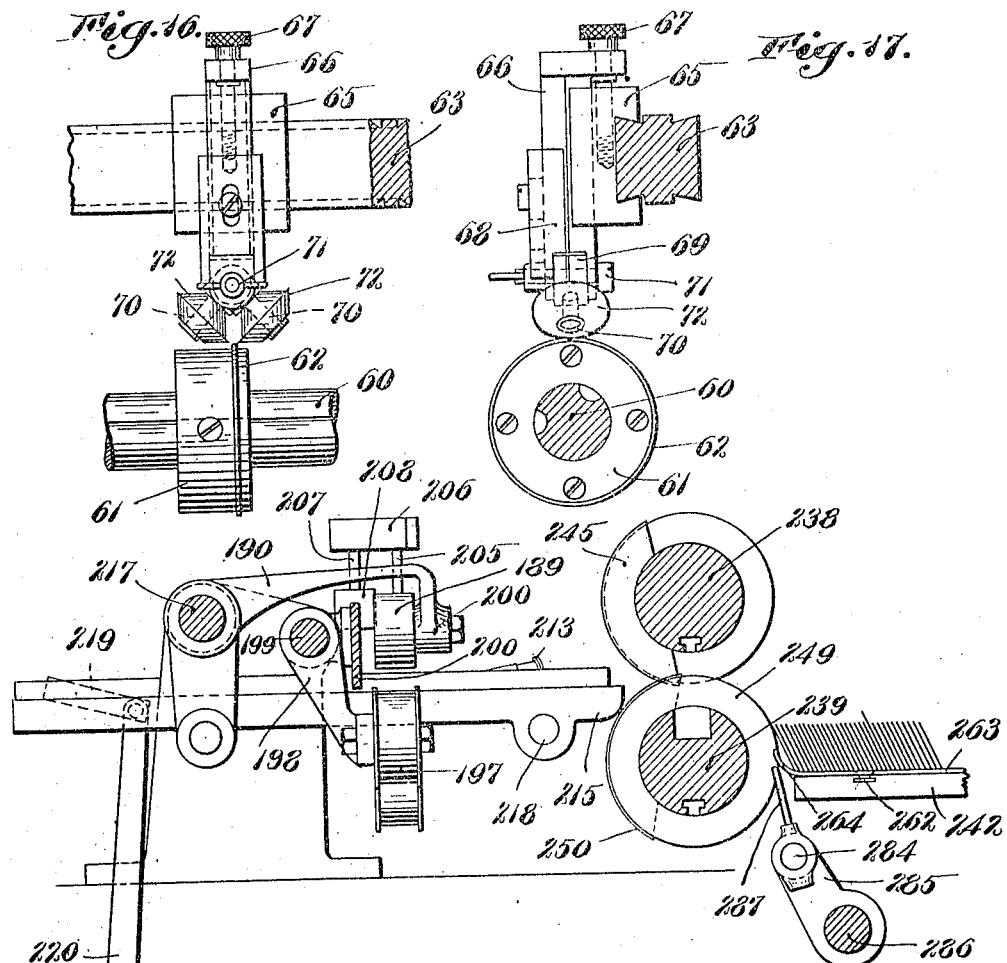
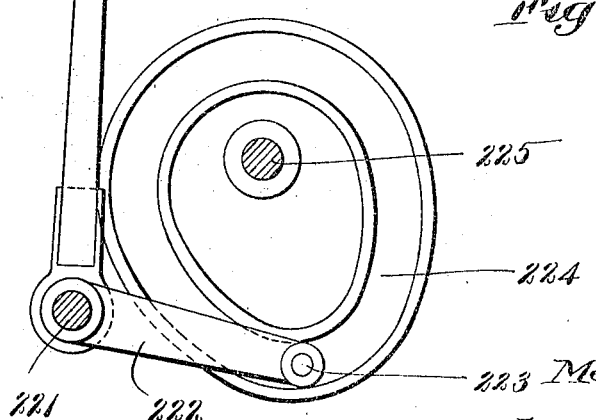
Inventor
Melvin H. Sidebotham
by
O. W. Harrison
atty.

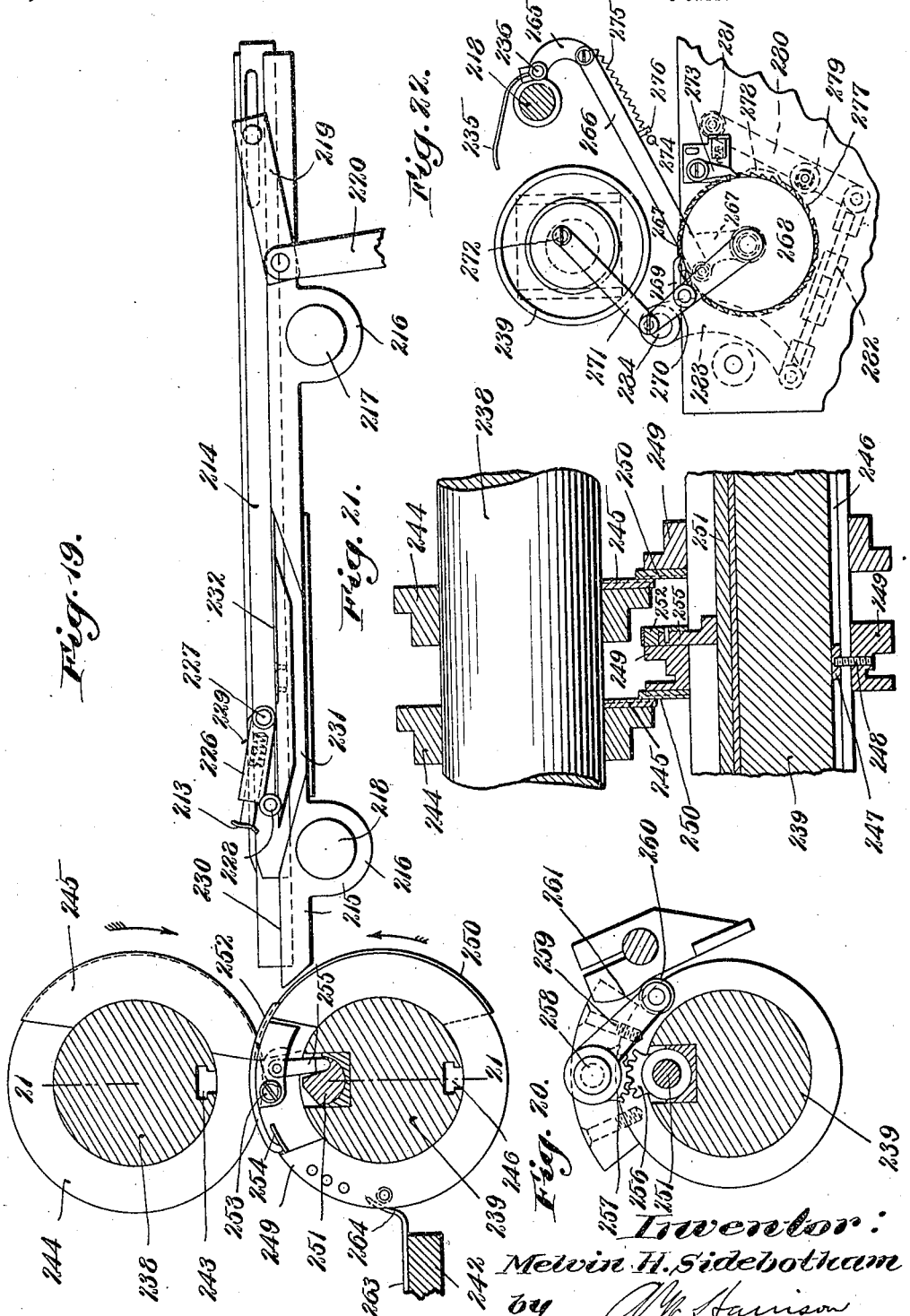

UNITED STATES PATENT OFFICE.

MELVIN H. SIDEBOTHAM, OF CLIFTONDALE, MASSACHUSETTS, ASSIGNOR TO ELIE W. LABOMBARDE, OF NASHUA, NEW HAMPSHIRE.

MACHINE FOR MAKING TUBULAR BOX-SHELLS.

1,298,586.  Specification of Letters Patent.  Patented Mar. 25, 1919.

Application filed June 13, 1918. Serial No. 239,858.

*To all whom it may concern:*

Be it known that I, MELVIN H. SIDE-BOTHAM, a citizen of the United States, and resident of Cliftondale, in the county of Essex and State of Massachusetts, have invented certain new and useful Improvements in Machines for Making Tubular Box-Shells, of which the following is a specification.

This invention relates to the manufacture of the outer members of slide boxes, which are commonly known as shells, and refers particularly to machines which convert long blanks into flattened tubes and cut the tubes transversely to produce box shells of the desired uniform lengths.

One of the objects of my invention is to provide an improved machine of this type having a high efficiency as to speed of operation.

Another object is to provide a machine of said type having little or no liability of spoiling shells, thereby reducing waste of material.

Another object is to provide mechanism for so disposing of the shells which rapidly accumulate that they can be packed in close order and in known quantities.

With these and other further objects in view, the invention consists in the structure and combination of parts substantially as hereinafter described and claimed.

Of the accompanying drawings:

Figures 1, 3, 5, 7 and 9 are plan views which, taken together, illustrate the machine.

Figs. 2, 4, 6, 8 and 10 are elevations of the parts of the machine shown respectively in Figs. 1, 3, 5, 7 and 9.

Fig. 11 represents a section on line 11—11 of Fig. 4, on a larger scale.

Fig. 12 represents a section on line 12—12 of Fig. 6, on a larger scale.

Fig. 13 represents a section on line 13—13 of Fig. 8, on a larger scale.

Figs. 14 and 15 are, respectively, a side elevation and sectional view of one of the pressure rolls.

Figs. 16 and 17 are, respectively, detail front and side elevations of one of the creasing mechanisms.

Fig. 18 represents a section on line 18—18 of Fig. 9, on a large scale.

Fig. 19 represents a section on line 19—19 of Fig. 9, on a large scale.

Fig. 20 is a detail sectional view showing the gripper operating mechanism.

Fig. 21 represents a partial elevation and partial section on line 21—21 of Fig. 19.

Fig. 22 is a side elevation of the counting mechanism.

Fig. 23 is a plan view of one of the long blanks to be folded by the machine.

Figures 5, 6:
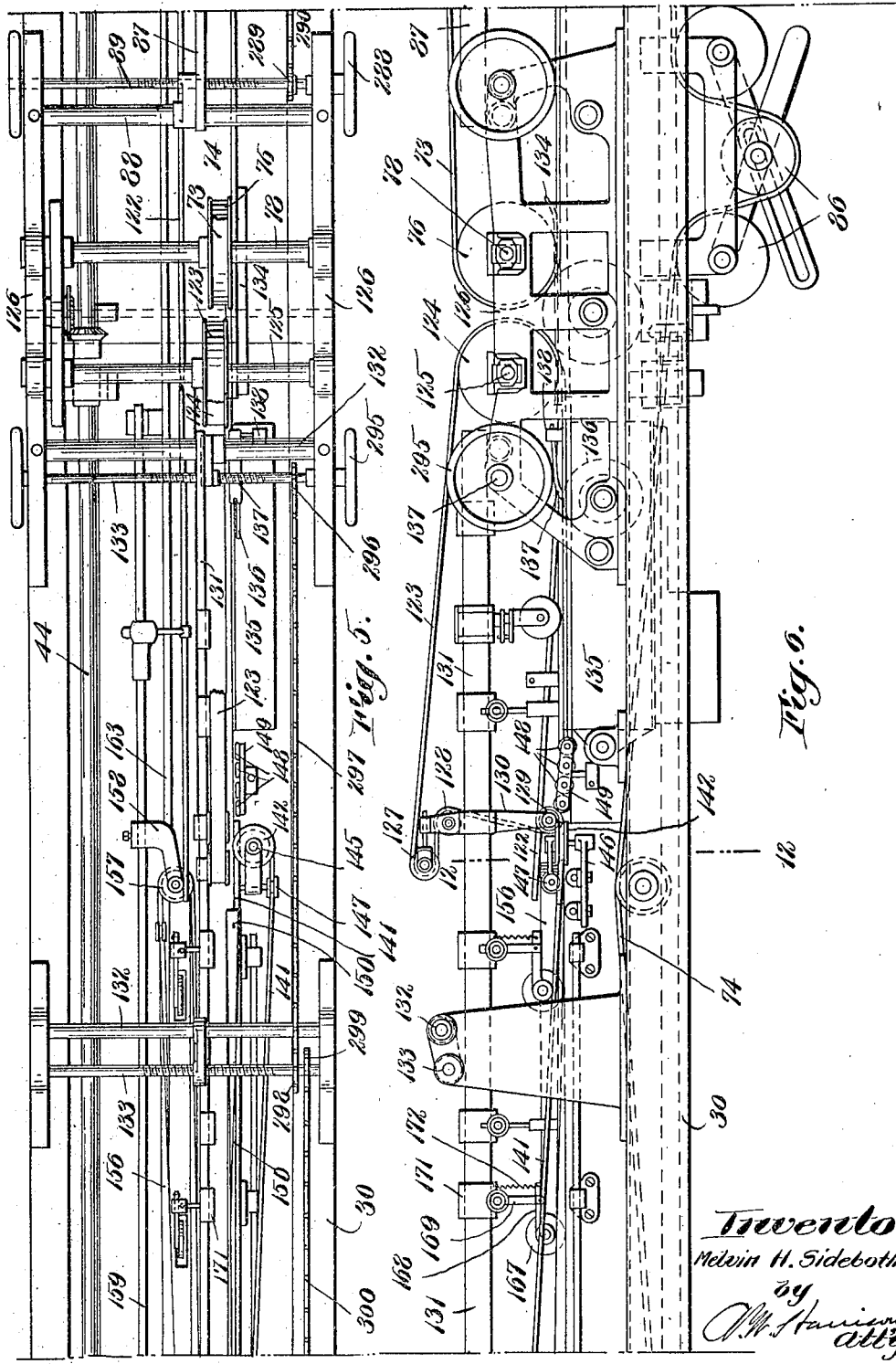

Figs. 24 to 30 inclusive are end views, with a few parts of the mechanism in section in some of the views, to illustrate how the blank shown in Fig. 22 is successively acted upon to convert it into a flat or flattened tube.

The main portions of the framework of the machine are indicated at 30, and portions of supporting legs at 31.

A feed wheel 32 (Figs. 1 and 2) having friction ribs or plugs 33 to engage and advance the long blanks one at a time, is carried by a shaft 34 supported by frame brackets 35. A portion of an inclined table for a pile of the blanks is shown at 36. The blanks pass over a shoe 37 and a roll 38 the upper portion of which projects through a slot in a plate 39. The shaft 34 has a pulley or sprocket 40 driven by a belt or chain 41. Details of the feed mechanism need not be further described as said mechanism forms no part of the present invention. The belt or chain 41 is driven by a pulley or sprocket carried by a shaft 42 connected by bevel gearing 43 with a long main shaft 44 extending practically the entire length of the machine.

Each blank is fed onto one or more carrier belts 45 (preferably three as shown in Fig. 1) the upper stretches running on suitable supporting strips. The pulleys for said belts are carried by shafts 46, 47, and tightener pulleys for said belts are provided at 48.

It is important that each long blank shall be so guided while being advanced by the belts 45 to the four creasers presently described, that said blank will be creased on lines uniformly parallel with the edge of the blank as indicated at $x$, $x'$, $y$, $y'$ in Figs. 23 and 24. To effect this I provide a guide or wall 49 supported by cross or tie rods 50, 51, and an upper horizontal strip 52 fastened to the guide 49. The right hand portion of section e of the blank runs under strip 52 and the edge of said section e is kept in contact with the guide wall 49 by a series of small disk rolls 53 preferably having friction peripheries. Each disk roll is mounted idly in a yoke having a pin 54 adjustable in a block 55 having a horizontal pin 56 adjustable in a block 57 which, in turn, is adjustable on a vertical pin 58 rising from a bracket block 59 mounted on edge guide 49.
By this universally adjustable mounting of the disk rolls they can be adjusted to suit any kind of blank, and at such an angle to the edge guide 49 as will best serve to laterally urge or deflect each blank against said edge guide and cause the blank to travel accurately to the ribbed creasing rolls carried by the two shafts 60. In Fig. 1 the angle at which the disk roll is set is somewhat exaggerated to more clearly illustrate the purpose of the rolls.

There are two rolls 61 adjustably carried by each shaft 60, so as to provide for forming the four crease lines $x, x', y, y'$, in the blank. Each roll 61 has an annular rib 62 with which a pair of pinching disks coact to form a crease line.

Referring to Figs. 16 and 17, in connection with Figs. 1 and 2, a cross bar 63, supported by frame brackets 64, has dovetail sides on which are four laterally adjustable blocks 65. Each block carries a hanger 66 vertically adjustable by means of a screw 67 and carrying a block 68 in which the hubs 69 of two stud shafts 70 are adjustably clamped by pivot bolt 71. Idly mounted on each shaft 70 is a disk 72. The parts just described are so adjusted that a pair of disks 72 coact with each roll 61 and its rib 62 (see Fig. 16) to form a crease in the blank without cutting into or otherwise rupturing the material of the blank.

The reason for mounting the rolls 61 on two shafts 60, 60, one beyond the other, instead of all four rolls on one shaft (and providing the coacting pairs of disks 72 in corresponding locations) is to be able to so shift them laterally relatively to each other to make the creases $x, x', y, y'$, in the blanks in the closest desirable relationship. Each roll 61 with its rib 62, and the coacting superposed disks 72, constitutes one creasing device, and there are four of them. Each necessarily occupies some width of space, and if all four were side by side they could never be set so close together as to make the four creases properly in some small blanks. By mounting the creasing device in two pairs, one beyond the other, such lateral adjustments thereof can be effected as to form the creases $y, y'$, but a small fraction of an inch from creases $x, x'$.
In fact creases $x$ and $y$ could be superposed and creases $x'$ and $y'$ could be superposed.

As the blank passes the four creasing devices it assumes the condition shown in Fig. 23, but before its rear end has been creased its forward end has reached mechanism which begins to break the blank (or re-fold which it as it is termed in practice) on the two lines $x x'$ (Fig. 25). As the blank passes beyond the creasing devices, it enters between a long narrow upper belt 73 and along wide lower belt 74 (Figs. 2, 4, 6 and 8). The upper belt is mounted on pulleys 75, 76 carried by shafts 77, 78, and the lower belt is mounted on pulleys 79, 80, carried by shafts 81, 82. The lower belt is longer than belt 73, its rear end and the pulley and shaft therefor appearing in Figs. 7 and 8. A suitable tightener for the belt 73 is indicated at 83 (Fig. 4) and one for belt 74 at 86 (Fig. 6). The belt 73 is broken away in Figs. 1, 2 and 5 to avoid concealment of parts below it. The upper stretch of belt 74 runs on rolls 84 mounted in a suitably supported cage or frame 85.

A bar 87 (Figs. 1 to 6 and 11) is mounted on cross bars 88 supported by frame brackets, and has ears engaging screw shafts 89 so that when the latter are simultaneously rotated the bar will be laterally adjusted. Adjustably mounted along the bar 87 are blocks 90 each of which has mounted therein a pin 91 carrying at its lower end an arm 92 which engages a pin 94 rising from a fork or yoke 93, the latter supporting the axle for a press roll 95 bearing on the upper surface of the lower stretch of belt 73.

The bar 87 also carries a series of blocks 96, each having a socket 97 for a pin 98 which is adjustably secured therein by a set screw 99. To the lower ends of the series of pins 98 is secured a long former bar 100 which is secured in a position just above wide belt 74 (Fig. 11) at one side of the narrow belt 73. Rising from the bar 100, at intervals, are posts 101 connected by cross pins 102 to the posts 103 of a former bar 104. Suitable means are provided for securing the posts 101, 103, to the cross pins 102 to vary the distance of the former bars 100, 104 apart, according to the sizes and proportions of the sections of the blanks to be operated upon, it being understood that the outer edges of the two former bars form the abutments against which the lines $x, x'$, of the blank are bent or broken upwardly by the devices presently described.

The former bars are held rigidly when adjusted to their proper heights by the set screws 99, but the belt 73 between said bars should be capable of bearing yieldingly on the blanks after the press rolls 95 have been adjusted to their proper height. For some purposes it is desirable to effect this yielding in two ways. One way is by providing a spring 105 (Fig. 11) in the socket of each block 90, to bear on pin 91. Another way is to form each roll 95 with a peripheral portion independent of its hub 106, with an intervening rubber or equivalent elastic annular portion 107, the latter having transverse apertures (Figs. 14 and 15) to increase its resilience. I do not limit myself to the employment of both means described for exerting yielding pressure because, unless a wide range of yielding movement of the peripheries of the rolls 95 is required, I may omit the springs 105.

As the blank reaches the control of belts 73, 74, its portion a rides onto a long thin bar 108 (Fig. 11 in connection with Figs. 1 and 3) which is so twisted that it gradually bends or "breaks" the narrow portion a on the line x which defines portion a, b, to an upright or nearly upright position (Fig. 26). The bar 108 is carried by a series of stud pins 109 each of which is adjustable in a socket 110 having a pin 111 adjustable in a block 112 that is also adjustable on a rod 113 mounted in brackets 114 secured to one of the cage walls 85. The twisted bar 108 is sufficiently flexible to enable it to be adjusted independently at different portions of its length by means of the series of stud pins 109 and the supports therefor as described, to secure just the desired action on the narrow portions a of the blanks. Said bar as a whole is also adjustable along the rod 113. At the same time, the right hand portions d, e, of the blank are gradually bent or "broken" on the other line x' to substantially the position shown in Fig. 26 by a series of wheels 115 which are successively differently shaped peripherally and mounted idly in vertical axes in a row, the first one being in the form of a thin flat cone, the others being gradually steeper pitched until the last one which is substantially cylindrical. Each wheel 115 is carried by a slotted arm 116 adjustably connected to a bar 117 supported by brackets 118 secured to one of the cage walls 85.

After the blank has been bent or broken (or re-folded as it is termed) on lines x, x', it is necessary, for the best results, that they shall be spread out substantially flat before reaching the gluing mechanism and the final folding mechanism. The narrow portion a readily springs out to a nearly flat position after leaving the twist bar 108. To guide the wide portions d, e, out and down, I provide an inclined bar 119 (Figs. 3 and 4) having its ends adjustably secured in studs 120 of blocks 121 mounted on the bar 87. The lower end of guide bar 119 directs the portion e onto a lifter or pick up finger 122 the main portion of which is shown in Figs. 5 and 6. Before the blank has traveled far enough along the finger 122 to cause portion e to be materially lifted, it leaves the control of belt 73 and passes under an upper belt 123 mounted at one end on a pulley 124 carried by shaft 125 supported by frame brackets 126, the other end of said belt running over pulleys 127, 128, 129 supported by a bracket 130 mounted on a bar 131 (Figs. 5 and 6). The belt 123 is not in line with belt 73 (Fig. 5) but is offset because the operation of bending the blank while under the control of belt 123 is to be on lines y, y', instead of lines x, x', as presently described.

The bar 131 is similar to bar 87 and is mounted on cross rods 132 and is provided with ears engaging screw shafts 133 whereby said bar may be laterally adjusted, said bar supporting former bars 139, 140, (Fig. 12) similar to former bars 100, 104, but not in line therewith for the same reason as that for which belt 123 is not in alinement with belt 73. A suitably supported shoe 134 (Figs. 5 and 6) guides the portion a of the blank under a blade or finger 137 supported by a post 138 mounted on a glue box 135, so that said portion a will be certain to contact with the glue wheel 136 the upper portion of which projects up through the top of the box.

The glue wheel applies adhesive to the under side of portion a of the blank, and it is of course essential that nothing shall contact with the adhesive during the folding of said portion. As the boxes produced by this machine have very narrow portions a b, whatever is to fold on the line y between portions b and c must be very narrow. And to prevent liability of lateral slipping due to sliding action, the folder should not be stationary but should travel with the blank. I therefore provide a round belt 141 mounted on pulleys 142, 143 (Figs. 5, 6, 7 and 8) the latter being carried by a shaft 144 and the former having its stud shaft 145 mounted vertically in a bracket 146 secured to the roll cage 85. A guide pulley 147 properly directs the belt 141.

To start the turning up or breaking of the blank on the line y between sections b, c, and direct section b onto the lower end of the acting stretch of round belt 141, I mount a series of small disk rolls 148 (Figs. 5 and 6) in an adjustable bar 149, said rolls 148 being thin and so set in position that they engage the under side of section b close enough to line y or far enough away from section a, to avoid any liability of glue on section a being wiped off onto rolls 148 or belt 141.

A backing for the operative stretch of belt 141 consists of a thin flat bar 150 (Figs. 5, 7, 12 and 13) having a series of studs 151 provided with sockets adjustably mounted on pins 152 rising from blocks 153 adjustably mounted on a rod 154 supported by brackets 155 attached to one of the walls of cage 85. Said bar 150 has its inner edge grooved to guide the round belt, is thin to avoid presenting any surface area with which the glued portion *a* of the blank might contact, and is wide enough and twisted so as to be strong enough to oppose tendency of the operative stretch of the belt 41 to be shifted out of its proper course of travel. It will be readily understood that when blanks some four or five feet long and of heavy material are being operated upon, the outward pressure of sections *b* against belt 141 is considerable. Hence the provision of the twisted guide and backing bar 150.

When, or soon after, the blank has advanced to position, where its section *b* engages rolls 148 and passes to the round folder belt 141, the section *e* has been folded or turned up to a substantially vertical position by the finger or rod 122 the higher end of which guides said section onto, or against the inner face of the operative stretch of a twisted folder belt 156 (Figs. 5, 7, 12 and 13). At one end the belt is mounted on a pulley 157 having its stud shaft in a substantially vertical position supported by a bracket 158 adjustably mounted on the long fixed bar 159. The other end is mounted on pulley 160 carried by shaft 144.

At suitable intervals the operative stretch of the twist belt is backed by idler rolls 161 mounted at proper varying angles, each roll 161 having its stud shaft adjustable in a sleeve 162 which is adjustable on supporting rod 163 carried by brackets 164 mounted on a fixed plate 165 which may be integral with bar 159.

The folder belts are so arranged relatively that belt 141 approaches the completion of its operation slightly in advance of that of belt 156, so that the glue bearing surface of section *a* of the blank will receive, on top of it, the edge portion of section *e* (compare Figs. 12, 13, 29 and 30).

The somewhat thick former bars 139, 140, terminate at a suitable portion of the machine where the sections *b*, *e*, of the blank commence to fold toward each other. To hold the sections *c*, *d*, flat on the wide belt 74 while the outer sections are being folded further inwardly I provide a thin former plate 166 (Fig. 13), said plate having suitable apertures at intervals to permit narrow pressure rolls 167 to ride idly on the long blanks. Each roll 167 is carried by a lever 168 pivoted to a pin 169 adjustable in a block 170 carried by a casting 171 mounted on bar 131, a spring 172 causing the roll to bear yieldingly on the blank.

From the mechanism so far described, the folded long blanks pass to mechanism to press them and firmly secure the overlapped glued areas together, said mechanism comprising wide upper and lower belts 173, 174, which, in practice, are longer than illustrated in Figs. 7 and 8. The upper belt 173 is mounted on pulleys 175, 176, and the lower belt 174 on pulleys 177, 178. The shafts of pulleys 175, 176, 177, 178, are indicated respectively at 179, 180, 181 and 182. A suitable tightener for belt 173 is shown at 183. A similar one is, in practice, provided for belt 174. Pressure rolls for the operative stretches of belts 173, 174, are indicated at 184, 185.

From the pressure mechanism just described, the folded and re-folded blanks pass to the mechanism which converts them to proper box shell lengths, it being understood of course that the blanks in the long flat tubular form as so far described are too long for any present known use. By first operating on long blanks and then successively cutting them to useful lengths, a very material saving of time is effected. One reason for this is that there must necessarily be some space between the ends of blanks being fed and folded. The shorter the blanks the greater is the total of the spaces between them. The greater the reduction of this spacing, the greater will be the amount of material operated upon at any given speed of the machine. For instance, if the spacing is 1 inch, there will be 16 inches of space lost for each 16 blanks. If the final product is to be box shells of 3-inch length, and I send through blanks four feet (48 inches) long and then cut those long flat tubes into 3-inch sections, I save fifteen of each of those sixteen inches of space. If the long flat tubes were to accummulate and then, later be cut to box lengths, time would be lost because of the extra handling required, and a separate feed mechanism (or hand feeding) would be necessary to supply the flat tubes to the cutter. By the mechanism which I shall now proceed to describe, each long flat tube is immediately converted into a series of box shell lengths, all of such lengths being obtained simultaneously and not successively from each flat tube.

As shown in Figs. 9 and 10 a short narrow belt 186 is mounted on a pulley 187 carried by a shaft 188 and a pulley 189 carried by a stud shaft supported by a bracket 190 mounted on a fixed supporting bar 199. A lower belt 191, under belt 186 and longer than it, is mounted at one end on a pulley 192 carried by shaft 193 and at the other end by a pulley 194 carried by a shaft 195. At two points the upper stretch of belt 191 is deflected downwardly to form cavities for the passage of pushers to shift each long tube laterally toward the cutters as presently described. Each of these deflections or cavities in the belt 191 is caused by a pulley 196 under which the belt runs, a pair of guide pulleys 197 being provided adjacent the pulley 196. The pulleys 196, 197, are supported in position by brackets 198 hung from the fixed bar 199.

The long flat tubes entering between belts 186, 191, in the direction of the arrow in Fig. 10 are longitudinally guided by a flat bar 200 (Fig. 9) and they run under shoes 201 the pins 202 of which are adjustably connected to brackets 203 mounted on the bar 200. The flat tubes are caused to run with their left-hand edges in contact with the face of the guide bar 200 by small disk rolls 204 mounted in yokes the pins 205 of which are adjustably connected to arms 206 mounted on pins 207 of brackets 208 mounted on bar 200. The disk rolls 204 are set at such an angle relatively to the guide bar 200 as to laterally urge the flat tubes on which they bear toward said guide bar.

To arrest each flat tube at the proper point of its longitudinal travel, prior to its being pushed off the belt 191 as presently described, I provide a series of stop rolls 209 (Fig. 9) carried by a bar 210 having a lateral arm or pin 211 adjustably supported by a bracket 212 secured to the end of bar 200. It is essential that the flat tube shall be shifted bodily, with neither end in advance of the other, when being pushed laterally toward the cutter and grippers presently described. Hence the rolls 209 are mounted to revolve freely so as to present no frictional resistance to the movement of the end of the flat tube which has been arrested thereby, past said rolls.

Two pushers 213 are provided, each carried by a slide 214 mounted on a slideway 215 supported by brackets 216 (Fig. 19) mounted on fixed rods 217, 218. The slideways are positioned in and crossing the cavities of belt 191 hereinbefore described (see Fig. 10) and are at such height that when the pushers 213 are advancing they travel in the plane of the flat tube on said belt 191. Each slide 214 is connected by a link 219 (Fig. 19) with an arm 220 of a rock shaft 221 having another arm 222 provided with a roll 223 engaging a cam groove 224 in a disk carried by shaft 225 (Fig. 18). The relative timing is such that the pushers advance almost the instant that each flat tube reaches the stop rolls 209.

When the pushers retreat, after transferring a tube to the cutting rolls, they do so in a lower plane so as to pass under the next tube that is being moved up to the stop rolls by the belt 191. To effect this, the shank of each pusher 213 is mounted in an arm 226 pivoted at 227 to the side of the slide 214, said arm having a lug 228 and a spring 229 exerting a constant light tendency to swing said arm down. When the slide is moving forward, the lug 228 rides along a track or shoulder 230 of the slideway, and on its return passes into a lower groove 231 (Fig. 19) so that the pusher 213 will pass under the tube that is coming to position to be next shifted by the pushers. As the lugs 228 of the two pusher arms reach the rear ends of the return grooves 231, they ride up and lift switch springs 232 so that when the pushers are next advanced, their lugs 228 will again ride on the tracks 230.

To support and guide the flat tubes which are being transferred from belt 191 to the cutter rolls, I provide plates 233 (Fig. 9) adjacent to the slideways 215, and an intermediate plate 234.

Near one of the plates 233 is a finger 235 carried by one end of a rock shaft 236 supported by one or more brackets 237. The purpose of said finger is to control the counter hereinafter described.

Upper and lower shafts 238, 239 (Fig. 18) geared together and carrying the series of cutters presently described, are mounted in frame brackets 240 connected by one or more tie rods 241. After the tubes are cut, the sections thereof (the box shells) pass somewhat edgewise onto a table 242 (Figs. 9 and 19).

The shaft 238 is formed with a longitudinal groove or slot 243 T-shaped in cross section. Mounted on the shaft are rings 244 each having a cutting segment 245. The shaft 239 is formed with a longitudinal groove or slot 246 T-shaped in cross section. Mounted on said shaft are rings 249 each having a cutting segment 250. By means of nuts 247 slidable along the wide portions of grooves 243, 246, and screws 248 threaded in holes in the hubs of the rings (Fig. 21) the rings can be adjusted along the shafts to effect proper spacing and insure coaction of the cutting segments of the rings, which revolve in the direction of the arrows in Fig. 19.

The shafts 238, 239, are so mounted in the brackets 240 that they can be removed to enable cutting rings to be removed from or placed thereon when it is desired to materially vary the number of sections into which the flat tubes are to be cut.

Mounted in shaft 239, and extending lengthwise thereof, is a rock rod 251 formed in cross section substantially as shown in Fig. 19. This rod controls the action of grippers 252 which takes hold of the advancing edge of each flat tube acted upon by the pushers. There is a gripper for each ring 249, so that a hold is kept on every portion of the tube that is to become a box section, thereby insuring simultaneous complete cutting throughout the length of the tube. Each gripper comprises a curved member 252 having a web fitting a recess in the ring 249 and pivoted therein at 253, a spring 254 pressing outward on the short end of the gripper to exert a constant tendency to hold the tip of the longer end against the face of the ring which is overlapped by said tip. Pivotally connected to the web of each gripper is a pawl 255 the inner end of which fits a groove or pocket in the rock rod 251 at one side of its axis of oscillation, so that whenever said rod is rocked, the consequent thrust against the pawls will raise or open all the grippers 252 high enough to permit the first edge of a flat tube to be inserted under them to a limit prescribed by the webs of the grippers.

I will now describe the mechanism for operating rod 251 to open the grippers:—At one end the rod 251 is provided with a toothed segment 256 (Fig. 20) meshing with the toothed segment 257 of a rocking stud 258 suitably mounted at the end of shaft 239, said stud having an arm 259 provided with a roll 260. A suitably shaped cam 261 fixed to the frame is engaged by the rolls 260, said cam being so positioned that each time the cutter shafts are revolved and the grippers are at, or approaching, the position shown in Fig. 19, the roll 260 engages said cam and rides over it. This acts to rock rod 251 so that all grippers are opened just in time for the advancing edge of a flat tube to enter under their tips. The cam is short and, as the roll 260 leaves it, the springs 254 close the grippers and also act, through the pawls 255, to return the rock rod and the intermeshing toothed segments to normal position. The grippers do not open again to release their hold on the work. Instead, the cut sections are arrested as presently described, and the grippers (which only hold the work somewhat lightly) slip off from the box sections.

The table 242 is provided with transverse T-grooves 262 in which are small blocks to which are secured metal strips 263 having upturned curved ears or fingers 264 extending into annular grooves formed in the rings 249 (Figs. 19 and 21). When the rings are adjusted along their shaft, the strips 263 are correspondingly adjusted along the grooves 262 in the table. The table and its strips are so supported, close to the rings which carry the grippers, that as the long flat tube is cut into box sections by the overlapping cutting segments, the grippers insure the passage of all box sections around with them until their lower edges are arrested by the tops of the strips 263 (Fig. 19) the fingers 264 guiding or deflecting the sections thereto. The box sections therefore accumulate on the table in rows, in somewhat edgewise positions. The grippers readily slip off from the sections when the latter are arrested.

To facilitate the picking up of the box sections by an attendant, for packing, in definite quantities (such as 50 in a bunch) I provide for arresting occasional sections so that they will not be carried down completely to the table by the grippers. To this end, the rock shaft 236 has, at its outer end, an arm 265, connected by a link 266 with a shield 267 pivoted on the axis of a ratchet 268 (Fig. 22) which is actuated by a pawl 269 carried by an arm 270 connected by a link 271 with a wrist or crank pin 272 rotating with shaft 239. A suitable detent pawl for the ratchet is indicated at 273. The parts are so proportioned and relatively arranged that for each rotation of the cutter shaft 239, the pawl 269 will actuate ratchet 268 the distance of one tooth, provided the shield 267 is not in position to keep the pawl away from the ratchet.

A spring 275 is connected at one end to a suitable fixed pin 274 and at the other end to arm 265, and tends to hold the parts normally in the position shown in Fig. 22, said position being determined by a pin 276 projecting from link 266 adapted to contact with fixed pin 274. In this position, the finger 235 is raised above the plane of passage of a flat tube on its way to be cut, and the shield 267 is under the pawl 269 so that, although the latter keeps swinging, it can not actuate the ratchet. Consequently, if no flat tube is being pushed over the finger 235 and depressing it, there will be no movement of the ratchet.

Rotatable with the ratchet is a disk 277 having a short rise or cam 278 adapted to engage a roll 279 carried by an arm 280 pivoted at 281 and connected by a link 282 with an arm 283 of a rock shaft 284 supported in brackets 285 mounted on cross or tie rod 286 (Fig. 22). The rock shaft 284 carries a series of upright pins 287, one adjacent the side of each table finger 264, the upper ends of said pins being blunt, and most of the time standing or extending into the annular grooves of cutter rings 249 where they are inactive. But when the ratchet 268 and its connected cam disk reach a position where cam 278 engages roll 279, the shaft 284 is rocked and all its pins 287 swing out slightly past the convex faces of the table strip fingers 264 and the next box sections to be brought down toward the table by the rotating grippers are arrested. The grippers leave them however, and they then move or shift out on the table, as other box sections are brought through by the grippers, but are held elevated by the slight friction of adjacent box sections, as indicated in Fig. 18.

It will now be understood that if the ratchet 268 has, for instance, 50 teeth, the pins 287 will be swung out to arrest each fiftieth box section in each of the plurality of rows of box sections accumulating on the table, regardless of whether or not the supply of flat tubes is interrupted. This is because if no flat tube is delivered to the cutting rolls the finger 235 will not be depressed and consequently the shield 267 will prevent pawl 269 from actuating the ratchet. And it is only when the 50-tooth ratchet (and its connected cam disk) has made a complete revolution that the cam 278 effects the swinging of the pins 287 out to arresting position.

Inasmuch as the particular gearing employed for driving the various parts of the machine from the long shaft 44 forms no part of the invention claimed herein, description thereof will be unnecessary herein although some of the gearing is illustrated in the drawings. It is to be understood of course that the gearing is constructed to provide for the proper relative timing of different parts such as the pushers 213 and the grippers 252. In Fig. 19 it is to be supposed that a flat tube is lying in front of the pushers which have almost finished their operative stroke, and that the shafts 238, 239 have almost reached their position of rotation where the grippers will rise or open.

Adjustments are, of course, effected by hand. To laterally adjust the long bar 87 which supports various parts, hereinafter described, I provide a hand wheel 288 carried by the screw shaft 89 shown in Fig. 5. Said shaft carries a sprocket 289 connected by a chain 290 with a sprocket 291 carried by the screw shaft 89 shown in Fig. 3. This shaft has another sprocket 292 connected by a chain 293 with a sprocket 294 carried by a screw shaft 89 shown in Fig. 1. Therefore, by rotating the hand wheel 288 the three screw shafts mentioned are rotated and the long bar 87 and its attached parts may be very accurately adjusted laterally.

The bar 131 which carries members more or less similar to those carried by bar 87, is independently adjustable laterally in order to operate properly on blanks of differently spaced creasing or widths of sections. For this purpose I provide a hand wheel 295 carried by the screw shaft 133 shown near the middle of Fig. 5. Said shaft also carries a sprocket 296 connected by a chain 297 with a sprocket 298 carried by the screw shaft 133 shown near the left in Fig. 5. This shaft has another sprocket 299 connected by a chain 300 with a sprocket 301 carried by the screw shaft 133 shown in Fig. 7. By rotating hand wheel 295, the three screw shafts 133 are rotated and the bar 131 and its attached parts may be accurately adjusted laterally.

The saving of time resulting from the continuous conversion of long narrow blanks into flat tubes and the immediate automatic cutting of the tubes into box sections or shells has been explained. It is also important that this operation shall result in no waste of material. The positive stop for the tubes, provided by the adjustable bar 210 and its rolls 209, is largely instrumental in effecting this result. To illustrate, the length of the blanks for the tubes will be such as will provide a given number of shells with no waste. A blank 48 inches long will furnish 16 shells each of which is 3 inches long. There will then be 15 pairs of cutters used on the shafts 238, 239, so adjusted lengthwise thereof that the lines of cut of the segments 245, 250, will be three inches apart. Then the bar of stop rolls 209 will be set so that each flat tube on the platform provided by the upper stretch of the belt 191 will be arrested at a point just 3 inches beyond the point at which the farthest pair of cutters will act when the pushers transfer said tube to the grippers. This will result in the conversion of the tube into 16 shells of 3 inch length with no waste at either end, providing the blanks are so accurately formed as to require no end trimming. In practice however I usually employ 17 pairs of cutters, with those at the ends of the shafts so set as to just trim the ends of the flat tubes.

The action of the pushers 213 is positive; that is, there is no uncertainty about the movement of each flat tube laterally. Any friction transferrer at this point would be liable to result in one end of the tube reaching the cutters in advance of the other end, or possibly might fail to shift the tube in time to reach the grippers while the latter are open to receive the front edge of the flat tube. The construction described however is such that the flat tubes are positively shifted or transferred at such predetermined intervals of time as to insure their being properly cut into sections on lines at an exact right angle to the length of the tubes. This would not be the case if one end of a flat tube were to pass to the cutters slightly in advance of its other end.

Having now described my invention, I claim:

1. A machine for making flat folded box shells comprising means for causing long blanks first to travel lengthwise, means for folding them while so traveling, means for positively pushing the folded blanks at predetermined intervals of time substantially at a right angle to their first path of movement, and means for cutting the folded blanks during their last mentioned movement.

2. A machine of the character described, comprising means for causing long blanks to first travel lengthwise, means for folding them while so traveling, a positive stop to arrest each folded blank at a predetermined point, means for then positively pushing the folded blanks laterally at predetermined intervals of time, and means for cutting the laterally moving folded blanks into sections.

3. A machine of the character described, comprising means for causing long blanks to first travel lengthwise, means for folding them while so traveling, a positive stop to arrest each folded blank at a predetermined point, means for adjusting said stop, means for then positively pushing the folded blanks laterally at predetermined intervals of time, and means for cutting the laterally moving folded blanks into sections.

4. A machine of the character described, comprising means for causing long blanks to first travel lengthwise, means for folding them while so traveling, a positive stop to arrest each folded blank at a predetermined point, means for adjusting said stop, means for then positively pushing the folded blanks laterally at predetermined intervals of time, and means for cutting the laterally moving folded blanks into sections, means being provided for adjusting the spacing of the cutting means.

5. In a machine of the character described, means for causing long blanks to travel, means for folding the traveling blanks, a stop for arresting the folded blanks, pushers to transfer them laterally, and cutters to sever them into sections.

6. In a machine of the character described, means for causing long blanks to travel, means for converting said blanks into flat tubes while traveling, a stop for arresting said tubes, reciprocating pushers to shift the arrested tubes laterally, means for causing the pushers to move in different planes when operating and returning, and cutters to sever the tubes into sections.

7. In a machine of the character described, a carrier belt for blanks, a laterally adjustable bar above the belt, a former bar dependable bar above the belt, a former bar depending therefrom and adjustably supported thereby, a second former bar supported by and adjustably connected with the first-mentioned former bar, and means for coöperating with the two former bars to bend the blanks.

8. In a machine of the character described, a carrier belt for blanks, means for bending blanks forwarded by the belt, yieldingly mounted hangers above the belt, and press rolls for insuring proper contact between the blanks and the forwarding belt, said rolls comprising separate hub and peripheral portions with an intervening body of rubber, said body having transverse apertures to increase its resilience.

9. In a machine of the character described, means for forwarding longitudinally creased blanks, and a flat twisted flexible bar positioned relatively to the path of movement of the blanks to gradually bend marginal portion of the blanks, means being provided for independently adjusting different longitudinal portions of said bar.

10. In a machine of the character described, means for forwarding longitudinally creased blanks and a flat twisted flexible bar positioned relatively to the path of movement of the blanks to gradually bend marginal portions of the blanks, means being provided for independently adjusting different longitudinal portions of said bar, means being also provided whereby the bar may be longitudinally adjusted.

11. In a machine of the character described, means for forwarding longitudinally creased blanks, and means for simultaneously bending opposite marginal portions of the blanks, the bending means on one side comprising a flat twisted flexible bar, and the bending means on the other side comprising a series of wheels successively differently shaped peripherally.

12. In a machine of the character described, means for forwarding longitudinally creased blanks, and means for simultaneously bending opposite marginal portions of the blanks, the bending means on one side comprising a flat twisted flexible bar, and the bending means on the other side comprising a series of wheels successively differently shaped peripherally, means being provided for independently adjusting different longitudinal portions of the twisted bar.

13. In a machine for folding longitudinally creased blanks having narrow edge portions to receive glue, means for forwarding the blanks, means for applying glue to the under surfaces of said narrow edge portions, a narrow folder to act on portions of the blanks next to and near said narrow edge portions, and a series of thin disks in an inclined row positioned to start the turning up of portions of the blanks and delivering said portions to the narrow folder.

14. In a machine for folding longitudinally creased blanks having narrow edge portions to receive glue, means for forwarding the blanks, means for applying glue to the under surfaces of said narrow edge portions, a narrow folder to act on portions of the blanks next to and near said narrow edge portions, and a series of thin disks in an inclined row positioned to start the turning up of portions of the blanks and delivering said portions to the narrow folder, said thin disks being carried by an adjustable bar.

15. In a blank folding machine, means for forwarding the blanks with extremely narrow projecting marginal portions, a small round twisted belt for folding said marginal portions of the blanks, and a guide bar for the operative stretch of said belt.

16. In a blank folding machine, means for forwarding the blanks with extremely narrow marginal portions, a small round twisted belt for folding said marginal portions of the blanks, and a guide for the operative stretch of said belt, said guide comprising a bar having a grooved edge receiving said stretch.

17. In a blank folding machine, means for forwarding the blanks, a small round twisted belt for folding marginal portions of the blanks, and a guide for the operative stretch of said belt, said guide comprising a thin twisted bar having a grooved edge receiving said stretch.

18. In a machine for folding blanks having opposite marginal portions relatively wide and narrow, means for forwarding the blanks, a small round twisted belt for folding the narrow portions, a twisted guide bar for said round belt, and a flat twisted belt for folding the wide portions.

19. In a machine for folding blanks having opposite marginal portions relatively wide and narrow, means for forwarding the blanks, a small round twisted belt for folding the narrow portions, a twisted guide bar for said round belt, and a flat twisted belt for folding the wide portions, said belts being relatively arranged to cause the round belt to complete its action before that of the flat belt.

20. In a machine of the character described, upper and lower blank-carrying belts, the upper one being shorter and narrower than the lower one, former bars adjacent the edges of the lower stretch of the upper belt, a thin flat former plate in alinement with and beyond the upper belt, a bar above said former plate, a series of levers pivotally supported by said bar, rolls carried by said levers, springs to cause said rolls to bear on blanks supported by the lower belt, and means coöperating with said former bars and plate to fold the blanks.

21. In a machine of the character described, means for converting blanks into tubes, a platform to receive the tubes, said platform having a plurality of cavities, pushers movable transversely of said cavities, and means for cutting the tubes into sections after they are pushed off from said platform.

22. In a machine of the character described, means for converting blanks into tubes, a platform to receive the tubes, said platform having a plurality of cavities, an adjustable stop to determine the position for arresting the tubes on said platform, pushers movable transversely of said cavities, and means for cutting the tubes into sections after they are pushed off from said platform.

23. In a machine of the character described, means for converting blanks into tubes, an endless belt to receive the tubes, means for deflecting portions of the upper stretch of said belt to form cavities therein, pushers movable transversely of said cavities, and means for cutting the tubes into sections after they are pushed off from said belt.

24. In a machine of the character described, means for converting blanks into tubes, an endless belt to receive the tubes, means for deflecting portions of the upper stretch of said belt to form cavities therein, an adjustable stop to determine the position for arresting the tubes on said belt, pushers movable transversely of said cavities, and means for cutting the tubes into sections after they are pushed off from said belt.

25. In a machine of the character described, means for converting blanks into tubes, an endless belt to receive the tubes, means for deflecting portions of the upper stretch of said belt to form cavities therein, an adjustable bar having a series of rolls in position to arrest movement of the tubes on said belt, pushers movable transversely of said cavities, and means for cutting the tubes into sections after they are pushed off from said belt.

26. In a machine of the character described means for converting blanks into flat tubes, an endless belt to receive the tubes, a guide bar for one edge of the tubes, means for automatically urging the tubes toward said bar, a stop to limit endwise movement of the tubes along said bar, and means for positively pushing the tubes away from said bar at predetermined intervals of time and cutting them into sections.

27. In a machine of the character described, means for converting blanks into flat tubes, an endless belt to receive the tubes, a guide bar for one edge of the tubes, means for automatically urging the tubes toward said bar, said means comprising a series of rolls adapted to bear on the tubes at an acute angle to their path of movement along said bar, a stop to limit endwise movement of the tubes along said bar and means for positively pushing the tubes away from said bar at predetermined intervals of time and cutting them into sections.

28. In a machine of the character described, means for converting blanks into tubes and then arresting them successively in predetermined position, cutters for dividing each tube into sections, reciprocating pushers for transferring the tubes from their arrested positions to said cutters, and means for causing said pushers to travel in a plane below that of the tubes when returning from their forward or pushing operations.

29. In a machine of the character described, means for converting blanks into tubes and then arresting them successively in predetermined position, cutters for dividing each tube into sections, slideways extending toward the cutters and having upper and lower tracks, slides mounted on said slideways, pushers pivotally connected to the slides and having lugs adapted to ride on said tracks, means for reciprocating the slides and their pushers, and means for insuring said lugs riding on the upper tracks when advancing and on the lower tracks when retreating.

30. In a machine of the character described, means for converting blanks into flat tubes and then arresting them successively in predetermined position, a pair of shafts having cutters and grippers, means for momentarily opening the grippers when in position to receive the edge of a tube transferred to them, and means for positively pushing each arrested tube to position in time to be grasped by the grippers.

31. In a machine of the character described, means for converting blanks into flat tubes and then arresting them successively in predetermined position, a pair of shafts having cutters and grippers, means whereby said cutters and grippers may be adjusted along said shafts, means for momentarily opening the grippers when in position to receive the edge of a tube transferred to them, and means for positively pushing each arrested tube to position in time to be grasped by the grippers.

32. In a machine of the character described means for converting blanks into flat tubes and then arresting them successively in predetermined position, a pair of shafts having coöperating cutters, means for shifting each arrested tube laterally toward the cutters, a rock rod mounted in one of the shafts, grippers carried by the shaft having said rock rod, springs for holding the grippers normally closed, means whereby rocking of said rock will open the grippers, and means for rocking the rod when the grippers are in proper rotary position to receive under them the edge of a tube shifted toward them.

33. In a machine of the character described, means for converting blanks into flat tubes and then arresting them successively in predetermined position, a pair of shafts having coöperating cutters, means for shifting each arrested tube laterally toward the cutters, a rock rod mounted in one of the shafts, grippers carried by the shaft having said rock rod, springs for holding the grippers normally closed, means whereby rocking of said rod will open the grippers, and means for rocking the rod when the grippers are in proper rotary position to receive under them the edge of a tube shifted toward them, said means comprising an arm connected to said rod to rock it, and a stationary cam in position to be engaged by said arm as it rotates with the shaft.

34. In a machine of the character described, means for converting blanks into flat tubes and then arresting them successively in predetermined position, a pair of shafts having cutters and grippers, means for momentarily opening the grippers when in position to receive the edge of a tube transferred to them, means for positively pushing each arrested tube to position in time to be grasped by the grippers, and a table having means for arresting the cut sections of tubes as they are carried around the shaft by said grippers.

35. In a machine of the character described, means for converting blanks into flat tubes and then arresting them successively in predetermined position, a pair of shafts having cutters and grippers, means for momentarily opening the grippers when in position to receive the edge of a tube transferred to them, means for positively pushing each arrested tube to position in time to be grasped by the grippers, and a table having means for arresting the cut sections of tubes as they are carried around the shaft by said grippers, said arresting means comprising fingers projecting upwardly from the table and intersecting the path of movement of the tube sections that are held by the grippers.

36. In a machine of the character described, means for converting blanks into flat tubes and then arresting them successively in predetermined position, means for positively pushing the tubes laterally at predetermined intervals of time, a pair of shafts each having a series of coöperating cutters for severing the tubes into sections while moving laterally and a table for receiving the cut sections, said table having a series of fingers for guiding the said sections onto the table.

37. In a machine of the character described, means for converting blanks into flat tubes and then arresting them successively in predetermined position, means for positively pushing the tubes laterally at predetermined intervals of time, a pair of shafts each having a series of coöperating cutters for severing the tubes into sections while moving laterally and a table for receiving the cut sections, said table having a series of fingers for guiding the said sections onto the table, said cutters being adjustable along their shafts to vary the lengths of the cut sections and the said fingers being correspondingly adjustable relatively to the table.

38. In a machine of the character described, means for converting blanks into flat tubes and then arresting them successively in predetermined position, means for positively pushing the tubes laterally at predetermined intervals of time, means for cutting the tubes into sections while moving laterally, a table for receiving the cut sections in rows, stops movable to and from position in the path of sections approaching the table, and means under the control of the work for moving said stops to operative position at predetermined intervals.

39. In a machine of the character described, means for converting blanks into flat tubes and then arresting them successively in predetermined position, means for positively pushing the tubes laterally at predetermined intervals of time, means for cutting the tubes into sections while moving laterally, a table to receive the cut sections in rows, stops movable to and from position in the path of sections approaching the table, and means under the control of the work for moving said stops to operative position at predetermined intervals, said last-mentioned means including a ratchet, means controlled by the passage of tubes to be cut for actuating the ratchet, and connections between said ratchet and said stops for controlling the position of the latter.

40. In a machine of the character described, means for converting blanks into flat tubes and then arresting them successively in predetermined position, a pair of shafts having grippers and cutters, means at one side of said shafts for positively pushing each arrested tube to said grippers in time to be grasped thereby, a table at the other side of the shafts, means for extracting the cut sections of tube from the grippers and directing them onto the table, a rock shaft having a series of blunt-tipped pins projecting above the plane of the table, and means for actuating the rock shaft at intervals controlled by the passage of a predetermined number of tubes to swing said pins into position to interrupt complete movement of cut sections onto the table.

41. In a machine of the character described, means for converting blanks into flat tubes and then arresting them successively in predetermined position, means for shifting the tubes laterally, means for cutting the tubes into sections while moving laterally, a table for receiving the cut sections in rows, stops movable to and from position in the path of sections approaching the table, a movable finger in the path of lateral movement of the tubes, and mechanically operated mechanism under the control of said finger for moving said stops to operative position.

42. In a machine of the character described, means for converting blanks into flat tubes and then arresting them successively in predetermined position, means for shifting the tubes laterally, means for cutting the tubes into sections while moving laterally, a table for receiving the cut sections in rows, stops movable to and from position in the path of sections approaching the table, a rock shaft having a finger in the path of lateral movement of the tubes, a ratchet and cam mechanism for controlling the position of said stops and mechanical connections with said rock shaft for controlling the operation of said ratchet and cam mechanism.

43. A machine for making flat folded box shells, comprising means for causing long blanks to first travel lengthwise, means for folding them while so traveling, means for causing the folded blanks to travel substantially at a right angle to their first path of movement, cutters for dividing the folded blanks into sections during their last mentioned movement, a table for receiving the cut sections, a movable finger in the path of the folded blanks on their way toward said cutters, and mechanically operated mechanism under the control of said finger for preventing complete deposit of said sections on the table at predetermined intervals.

In testimony whereof I have affixed my signature.

MELVIN H. SIDEBOTHAM.

Copies of this patent may be obtained for five cents each, by addressing the "Commissioner of Patents, Washington, D. C."